Patented Mar. 17, 1931

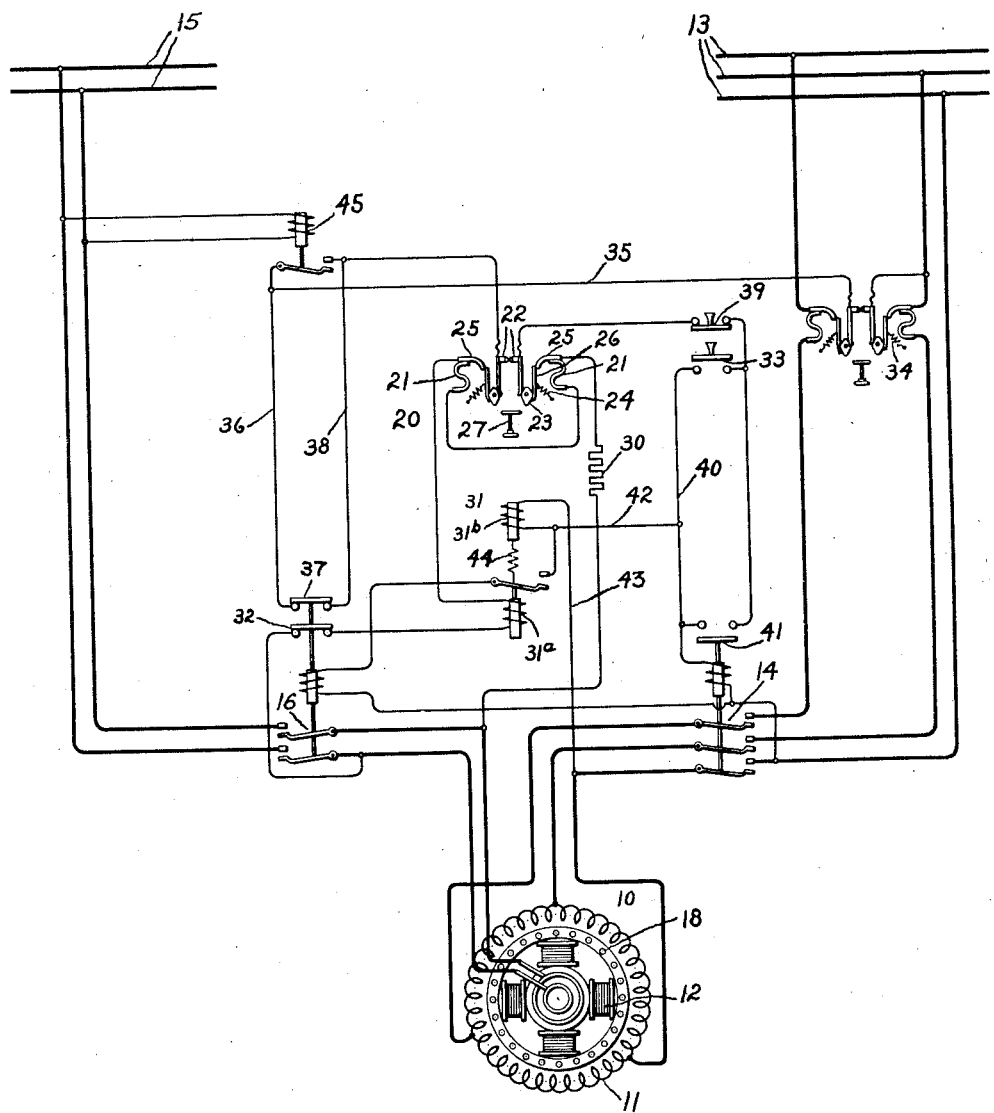

1,797,009

UNITED STATES PATENT OFFICE

RICHARD M. MATSON, OF SCHENECTADY, NEW YORK, ASSIGNOR TO GENERAL ELECTRIC COMPANY, A CORPORATION OF NEW YORK

CONTROL SYSTEM

Application filed October 23, 1928. Serial No. 314,483.

My invention relates to the control of electric motors, more particularly to the control of alternating current synchronous motors, and has for its object the provision of a simple and efficient system of control for a synchronous motor whereby the amortisseur or starting winding will be protected against abnormal circuit conditions.

It will be understood that practically all self-starting synchronous motors are provided with an alternating current starting winding, such as a squirrel cage or amortisseur winding embedded in the field pole pieces. It will be further understood that if alternating electromotive forces are applied to the stator of such a machine, the field coils being deenergized and included in a local circuit, the machine will start up substantially as an induction motor and will approach practically synchronous speed. If the field coils are then excited, the machine will tend to pull itself into synchronism.

One of the factors which leads to high starting torque is a high resistance amortisseur or starting winding. Since the amortisseur winding of a synchronous motor functions chiefly during the starting period, the losses that occur are important only from the aspect of heating, and not as effecting the running efficiency. Thus, the synchronous motor is often provided with a very high resistance amortisseur winding which will develop large starting torques, this winding being of much higher resistance than would be permitted were the motor to function continuously as an induction machine. Consequently the amortisseur or starting winding is the weakest point thermally of a synchronous machine.

It often happens that the motor does not accelerate to its synchronous speed in the anticipated time, perhaps because of some mechanical defect in the machine itself or because of heavy loads and as a result the amortisseur winding becomes highly heated. Should the accelerating period be unduly prolonged, the amortisseur winding would be destroyed long before the ordinary motor protective devices function. Furthermore, the amortisseur is subjected to high temperatures and thus to danger of destruction in case there be such a loss of field excitation that the motor should fall out of step.

In one of its aspects my invention contemplates the provision of a control system for a synchronous motor whereby the amortisseur or starting winding will be protected against abnormal thermic conditions.

In carrying my invention into effect in one form thereof, I provide control means responsive to a predetermined abnormal condition in the motor field windings, as for example, to the current induced in the motor field windings, to effect an interruption of the main motor power circuit. Thus, since the current induced in the amortisseur winding is normally proportional to the current induced in the field windings, for all practical purposes my control means operates to open the motor power circuit in dependence upon the thermic condition of the amortisseur winding. I further cause my control means to respond in dependence upon the magnitude of the abnormal condition so that the motor power connections will be interrupted in an interval of time which will be inversely proportional to the magnitude of the condition.

For a more complete understanding of my invention reference should be had to the accompanying drawing, the single figure of which is a diagrammatic representation of a control system embodying my invention.

Referring to the drawing I have shown my invention in one form in connection with a synchronous motor provided with an amortisseur or an alternating current starting winding. As shown, the motor 10 is provided with a suitable three phase winding 11 upon its stator member together with field windings 12 mounted on a rotor member. A suitable three phase source of alternating current supply 13 is provided for the armature winding 11. In order to control the power connections for the synchronous motor, a suitable switch 14, shown as an electro-responsive switch, is interposed in the connections leading to the synchronous motor from the supply source. A suitable source of direct current supply 15 is provided for exciting the motor field windings 12, a suitable electro-responsive switch 16 being inserted in the connections leading from the source 15 to the field windings so that the energization of these windings may be controlled as desired. It will be understood that any suitable exciter, as for instance a motor shaft driven exciter may be provided to supply the field windings 12.

The synchronous motor 10 is also provided with an amortisseur or starting winding 18 on its rotor member in order that the motor may be self-started. If alternating electromotive forces are applied to the stator of the motor, the field coils not being excited and connected in a local circuit, the motor will start up substantially as an induction motor and will approach practically synchronous speed. If the local field circuit then be interrupted and the field coils be excited, the machine will tend to pull itself into synchronism.

In order to protect the amortisseur winding against overheating either because of undue prolongation in the acceleration of the motor or because of some other abnormal motor operating condition, I provide control means arranged to interrupt the motor power connections in response to some predetermined condition of the field windings which condition, for all practical purposes, will be a measure of the thermic condition of the amortisseur winding. As shown, I provide control means 20 which is thermally and inversely responsive to the current induced in the motor field windings. Any suitable inverse time element control device, which depends upon a certain current for operating it, may be employed. Preferably and as shown, I employ that described and claimed in U. S. Patent No. 1,527,645, granted to C. I. Hall and dated February 24, 1925.

This control device comprises a pair of heating elements 21 which are arranged to be included in series in a circuit, the current of which is to be utilized to operate the device. In my control system these heating elements will be included in a local circuit with the field winding. The mechanism further comprises suitable contacts 22 which are inserted in the circuit to be controlled or in a controlling circuit for the circuit to be controlled. In my control system these contacts will be inserted in the energizing circuit for the operating coil of the contactor 14. Each of the contacts 22 is mounted upon a suitable pivoted insulated block 23 which is biased to an open position by means of an associated tension spring 24. The contacts 22 are normally held in their closed position, however, by means of suitable thermostatic strips 25 which are arranged to engage the sliders 26, mounted upon the blocks 23, and are further arranged in a position adjacent to the heating elements 21 included in the local field circuit. Thus, should the thermostatic latches 25 be heated to such a degree that they will release the sliders 26, the contacts 22 will be quickly opened under the influence of their biasing springs 24. A suitable reset device 27 is provided to return the contacts to their closed position in the event they have been opened by operation of the mechanism. It will be observed that after the thermal responsive switch has been operated, the energizing circuit for the contactor 14 cannot be maintained complete until the thermostatic latches, which have effected the opening of the circuit, have cooled sufficiently to engage with their respective sliders.

The control system for the synchronous motor 10 comprises suitable control means operative so as to include the motor field windings in a local circuit during the starting period and further to interrupt this circuit and connect the field windings to their energizing source of supply in response to the approach of the synchronous motor to its synchronous speed. The control system further comprises control means, which may be remotely located with respect to the motor, whereby the control switch 14 may be energized so as to initiate operation of the motor.

As shown, when the field control switch or field contactor 16 is in its open position, the field windings 12 of the synchronous motor will be connected in a local circuit which may be traced from the upper brush leading from one terminal of the field windings through the field discharge resistor 30, the heating elements 21 of the thermal switch 20, the operating coil 31a of a suitable field relay 31, the purpose for which will be described hereinafter, and thence through the interlock 32, which will be closed by the open field contactor 16, to the lower brush leading from the other terminal of the field windings. As thus far described, it will be observed that as long as the field contactor 16 remains in its open position, the field windings will be connected in a local circuit together with the thermal switch 20 and the field discharge resistor 30. It will also be observed that immediately upon the closing of the field contactor 16 so as to effect an energization of the field windings, the interlock 32 will be opened so as to interrupt the field winding local circuit.

Referring to the drawing, it will be observed that suitable remote control means, illustrated as a push button 33, is provided for initiating the energization of the power contactor 14, and consequently for initiating the operation of the synchronous motor.

Moreover it will be observed that the field contactor 16, when in its open position, operates to complete an energizing circuit for the operating coil of the line contactor 14 in the event the starting push button 33 is depressed. As shown, when this button is depressed an energizing circuit for the operating coil of the line contactor 14 will be completed from the middle conductor of the supply source 13 through the contacts of the temperature overload relay 34, the conductor 35, the conductor 36, the interlock 37, which will be maintained in its closed position by the open contactor 16, the conductor 38, the contacts 22 of the switch 20, the normally closed stop push button 39, the start push button 33, the conductor 40, and thence through the operating coil of the contactor 14 to the lower conductor of the supply source 13. As a result, the contactor 14 will be closed and thereby establish power connections for the motor 10. Furthermore, the contactor 14 in closing establishes a holding circuit for itself which circuit may be traced from the normally closed stop button 39 through the interlock 41, which will be closed by the contactor 14, and thence through the operating coil of the contactor to the lower supply conductor. Thus, the start button 33 need only be depressed momentarily to close the contactor 14, the holding circuit established by the closing of the contactor thereafter maintaining the established power connections.

As has been stated, it is desirable to control the opening of the field local circuit and their connection to the source of exciting supply in response to the approach of the motor to its synchronous speed. I conveniently effect this control by means of the field relay 31 which controls an energizing circuit for the operating coil of the field contactor 16. As shown, when the relay is closed, it will complete the energizing circuit from the middle conductor of the supply 13, through the contacts of the temperature overload relay 34, the conductor 35, the conductor 36, the interlock 37, the conductor 38, the contacts 22 of the switch 20, the stop push button 39, the interlock 41, the conductor 40, the conductor 42, the contacts of the relay 31 and thence through the operating coil of the contactor 16 to the lower conductor of the supply source 13.

It will be observed that immediately upon the closing of the line contactor 14 the upper operating coil $31b$ of the field relay 31 will be energized from the alternating current supply source 13 by means of a circuit which may be traced from the conductor 40, through the conductor 42, the coil $31b$ and thence through the conductor 43 to the lower conductor of the supply source 13. It will also be observed that the lower operating coil $31a$ of the relay 31 will be connected in the local field circuit. Thus, the pull exerted by the coil $31a$ will be proportional to the current induced in the field winding during the starting period and so will vary from a maximum when the motor is first started to practically zero when the motor approaches its synchronous speed. This characteristic of the pull exerted by the coil $31a$ is utilized in controlling the field contactor 16 to close at the proper time. It will be observed that the relay 31 will be biased to its open position by the variable pull exerted by the coil $31a$ assisted by a suitable compression spring 44, and to its closed position by the constant pull exerted by the coil $31b$.

The control system further comprises a field protective contactor 45 energized from the supply source 15. This contactor will be normally closed so as to complete the holding circuit for the operating coil of the line contactor 14 when the field contactor 16 is closed and its associated interlock 37 is thereby opened. If for any reason the voltage of the excitation source be lost, the field protective contactor 45 will open, thus interrupting the holding circuit for the line contactor 14 which thereupon will open to interrupt the motor power circuit.

The overload protective relay 34 is provided for the usual purpose, that is, protecting the motor against excessively heavy currents. Preferably, this relay should be of the inverse time element type which depends upon a certain current for opening it. Thus, a relay similar to the thermal switch 20 may be conveniently employed for this purpose. It will be understood that this relay operates in response to the heating effect of the current flowing in the conductors leading to the synchronous motor. Thus, when the current taken by the motor is abnormally high, the relay will operate to interrupt the holding circuit for the contactor 14, which thereupon will immediately open the motor power circuit.

The operation of my control system is as follows: Let it be assumed that the start push button 33 has been depressed so as to close the energizing circuit for the operating coil of the line contactor 14. The contactor 14 will close and thus establish power connections for the motor 10 which will start up as an induction motor. As the motor speed increases and approaches synchronism, the pull exerted by the operating coil $31a$ of the relay 31 will decrease. When the motor has approached practically synchronous speed this pull will have decreased to such a value that it will be over-powered by the constant pull exerted by the coil $31b$ and the field relay will close. The energizing circuit for the operating coil of the field contactor 16 will then be completed and the contactor will be operated to its closed position.

As a result of this operation the local circuit which includes the field windings will be interrupted and the field windings will be connected directly to their direct current supply 15. The motor will then pull itself into synchronism and operate as a synchronous motor. When it is desired to stop the motor, it is but necessary to depress the stop button 39.

It will be understood that whenever a local field circuit is established, either during the starting period or because the field contactor 45 has been opened for some reason, as for instance, the burning out of its operating coil, the thermal responsive switching mechanism 20 will be included so as to control the opening of the line contactor 14 in response to an abnormal field current. Thus, in the event the load imposed upon the motor be high enough to cause very high induced field currents, the thermic condition of the field windings and likewise that of the amortisseur will be abnormally high, and in which event the mechanism 20 will operate to shut the motor down. On the other hand, should the acceleration of the motor be unduly prolonged so that even though the current induced in the field windings be of a value which normally would be safe, still the amortisseur may be destroyed because of the prolonged acceleration period. Likewise in event of these conditions the mechanism 20 will operate to shut the motor down. The mechanism 20 furthermore prevents the closing of the line contactor 14 until the abnormal conditions have been alleviated or until the motor has sufficiently cooled to permit safe operation thereof.

It will be understood, of course, that the magnitude of the current induced in the motor field windings and also that induced in the amortisseur will depend upon the slip of the synchronous motor, the greater the slip, the greater the induced currents. It will be obvious, therefore, that the heating effect of the current induced in the motor field windings will be proportional to the motor slip, the greater the slip, the greater the heating effect. It will also be obvious that this heating effect of the current induced in the motor field winding, for all practical purposes, will be a measure of the heating effect of that induced in the amortisseur winding and thus a measure of the thermic condition of the amortisseur winding.

Thus, this inverse time element switching mechanism 20 takes into account the heating effect caused by the current induced in the field windings of the synchronous motor and controls the main motor power circuit so that this circuit will be automatically opened when an abnormal current condition exists in the local field circuit. It will be understood that the current induced in the field windings of the synchronous motor may be abnormal even though of a relatively small value provided the synchronous motor does not accelerate and this current is maintained for an undue length of time. On the other hand, the load imposed upon the motor may be high enough to cause a very high induced current in the field winding circuit, a current much higher than would ordinarily be the case during normal acceleration. It is pointed out that any current condition of the local circuit which produces abnormal thermic conditions will be construed as abnormal, and further that the switch 20 responds in an interval of time inversely proportional to the magnitude of the abnormal condition.

While I have described my invention as embodied in concrete form and operating in a specific manner in accordance with the provisions of the patent statutes, it should be understood that I do not limit my invention thereto, since various modifications thereof will suggest themselves to those skilled in the art without departing from the spirit of my invention, the scope of which is set forth in the annexed claims.

What I claim as new and desire to secure by Letters Patent of the United States, is:

1. The combination with an alternating current synchronous motor, of means for establishing power connections for said motor, means arranged to include the motor field windings in a local circuit and means responsive to a predetermined excessive current condition in said local circuit for opening said motor power connections.

2. The combination with an alternating current synchronous motor provided with an amortisseur winding, of control means for establishing power connections for said motor and means responsive to a predetermined excessive current condition in the field windings of said motor for opening said motor power connections during the starting period.

3. The combination with an alternating current synchronous motor provided with an alternating current starting winding, of control means for establishing power connections for said motor, switching means arranged to include the motor field windings in a local circuit during the starting period and means thermally responsive to the current induced in said field windings connected to effect an interruption of said motor power connections upon the persistence of an abnormal field current for an interval of time inversely proportional to the magnitude of said current.

4. The combination with an alternating current synchronous motor provided with an amortisseur winding, of control means for establishing power connections for said motor, switching means arranged to include the motor field windings in a local circuit and means for protecting said amortisseur winding comprising inverse time element switching mechanism thermally responsive to the current induced in said field winding arranged upon operation thereof to open said motor power circuit.

5. The combination with an alternating current synchronous motor provided with an amortisseur winding, of control means for establishing power connections for said motor, switching mechanism arranged to include the motor field windings in a local circuit during the starting period, and means for protecting said amortisseur winding comprising switching mechanism included in said local circuit thermally responsive to the current induced therein and electrical connections controlled by said thermal responsive switching mechanism whereby upon the persistence of an abnormal field current condition said control means is caused to open said motor power circuit.

6. The combination with an alternating current synchronous motor provided with an amortisseur winding, an electro-responsive switch operative to establish power connections for said motor, switching means operative to establish a local circuit for the field windings of said motor and operative responsively to the current induced in said field windings to interrupt said local circuit and to establish exciting connections for said field windings and means for protecting said amortisseur winding comprising a thermal responsive switch included in said local circuit and arranged to control said electro-responsive switch whereby said switch is operated to open said motor power circuit in the event said motor is delayed an abnormal interval of time in attaining its synchronous speed.

7. The combination with an alternating current synchronous motor provided with an amortisseur winding, of an electro-responsive switch for establishing power connections for said motor, control means for establishing exciting connections for the motor field windings, switching mechanism arranged to establish a local circuit for said motor field windings during the starting period, means responsive to the establishment of said motor power connections and to the current induced in said local circuit arranged to open said local circuit and to cause said field winding control means to close its exciting connections upon the approach of said motor to its synchronous speed and means for protecting said amortisseur winding comprising inverse time element switching mechanism thermally responsive to the current induced in said local circuit and electrical connections controlled by said thermal responsive switching mechanism whereby upon operation thereof in response to a thermic condition of said field winding said electro-responsive switch is operated to open said motor power connections.

8. The combination with an alternating current synchronous motor provided with an alternating current starting winding of control means for establishing power connections for said motor, means arranged to include the motor field windings in a local circuit and means for protecting said alternating current starting winding comprising inverse time element switching mechanism thermally responsive to the current induced in said local circuit arranged upon operation thereof to open said motor power circuit and to prevent re-establishment thereof until said starting winding has cooled sufficiently to permit safe operation.

In witness whereof, I have hereunto set my hand this 22nd day of October, 1928.

RICHARD M. MATSON.